United States Patent [19]

Edwards et al.

[11] 4,269,812

[45] May 26, 1981

[54] HORIZONTAL CROSS-FLOW SCRUBBER FOR SULFUR OXIDE REMOVAL

[75] Inventors: William M. Edwards; C. Peter Huang, both of Houston, Tex.

[73] Assignee: Pullman Incorporated, Chicago, Ill.

[21] Appl. No.: 61,225

[22] Filed: Jul. 27, 1979

[51] Int. Cl.³ ............................................. C01B 17/00
[52] U.S. Cl. ...................................... 423/242; 55/73
[58] Field of Search .......... 423/242 A, 242 R, 244 A, 423/244 R; 55/73

[56] References Cited

U.S. PATENT DOCUMENTS

| | | | |
|---|---|---|---|
| 2,215,707 | 9/1940 | Matanovich et al. | 261/18 |
| 3,237,381 | 3/1966 | Huostoff et al. | 55/89 |
| 3,948,608 | 4/1976 | Weir | 423/242 X |
| 4,039,307 | 8/1977 | Bondor | 55/228 |

OTHER PUBLICATIONS

"Performance Characteristics of Spray-type Absorption Equipment", Pigford et al., Engineering & Process Development, I and EC, Jul. 1951.
"Mass Transfer in The Kellogg-Weir Air Quality Control Systems (AQCS)" Edwards et al., Mar. 1977.
"The Kellogg-Weir Air Quality Control System" Edwards et al., CEP, Aug. 1977.

*Primary Examiner*—O. R. Vertiz
*Assistant Examiner*—Gregory A. Heller

[57] ABSTRACT

Sulfur dioxide removal efficiency of a horizontal cross-flow gas liquid contactor is increased by decreasing the interfering spray density.

6 Claims, 9 Drawing Figures

(a) SPRAY CROSS-SECTION ALONG NOZZLE ROW (b) Y = 0.047 m
$r_Y$ = 0.082 m (c) Y = 0.055 m
$r_Y$ = 0.095 m (d) Y = 0.094 m
$r_Y$ = 0.163 m (e)

$Y = 0.098 m$
$r_Y = 0.17 m$ (f)

$Y = 0.13 m$
$r_Y = 0.225 m$ (g)

$Y = 0.166 m$
$r_Y = 0.288 m$ (a) SPRAY CROSS-SECTION ALONG NOZZLE ROW (b) n CONES OF SPRAY AT S SPACING

Y = 0.136 m
$r_y$ = 0.235 m (c)

Y = 0.2 m
$r_y$ = 0.35 m (d)

Y = 0.27 m
$r_y$ = 0.47 m (e)

S' (1.02m)

Y = 0.294 m
$r_Y$ = 0.51 m (f)

S' (1.02m)

S' (1.02m)

Y = 0.325 m
$r_Y$ = 0.563 m

HORIZONTAL CROSS-FLOW SCRUBBER FOR SULFUR OXIDE REMOVAL

This invention relates to the removal of sulfur dioxide from industrial waste gas, for example combustion gas from steam power plants, by wet scrubbing the gas in a horizontal, elongate, gas-liquid contractor with an aqueous absorbent.

Figure 1:
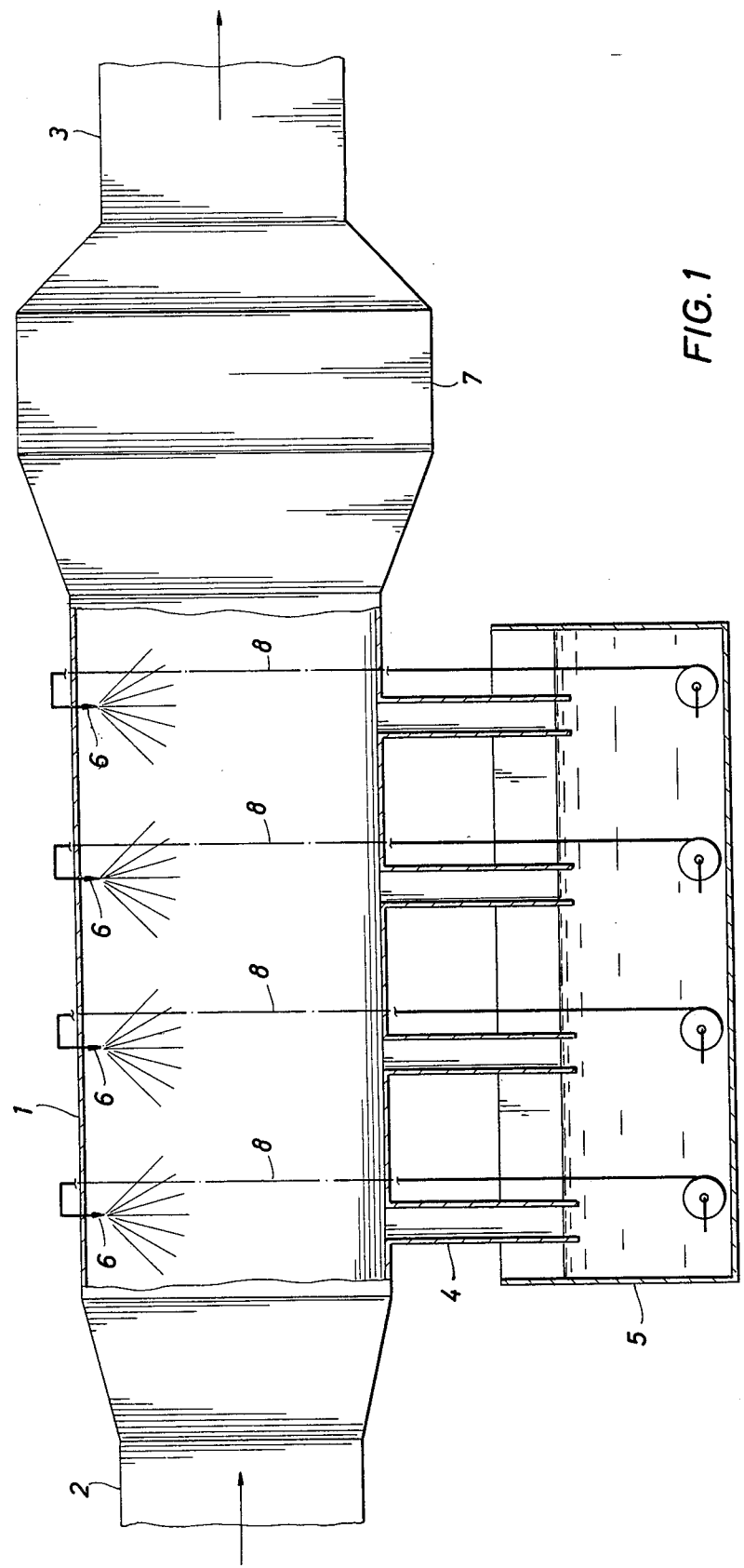
Figure 2:
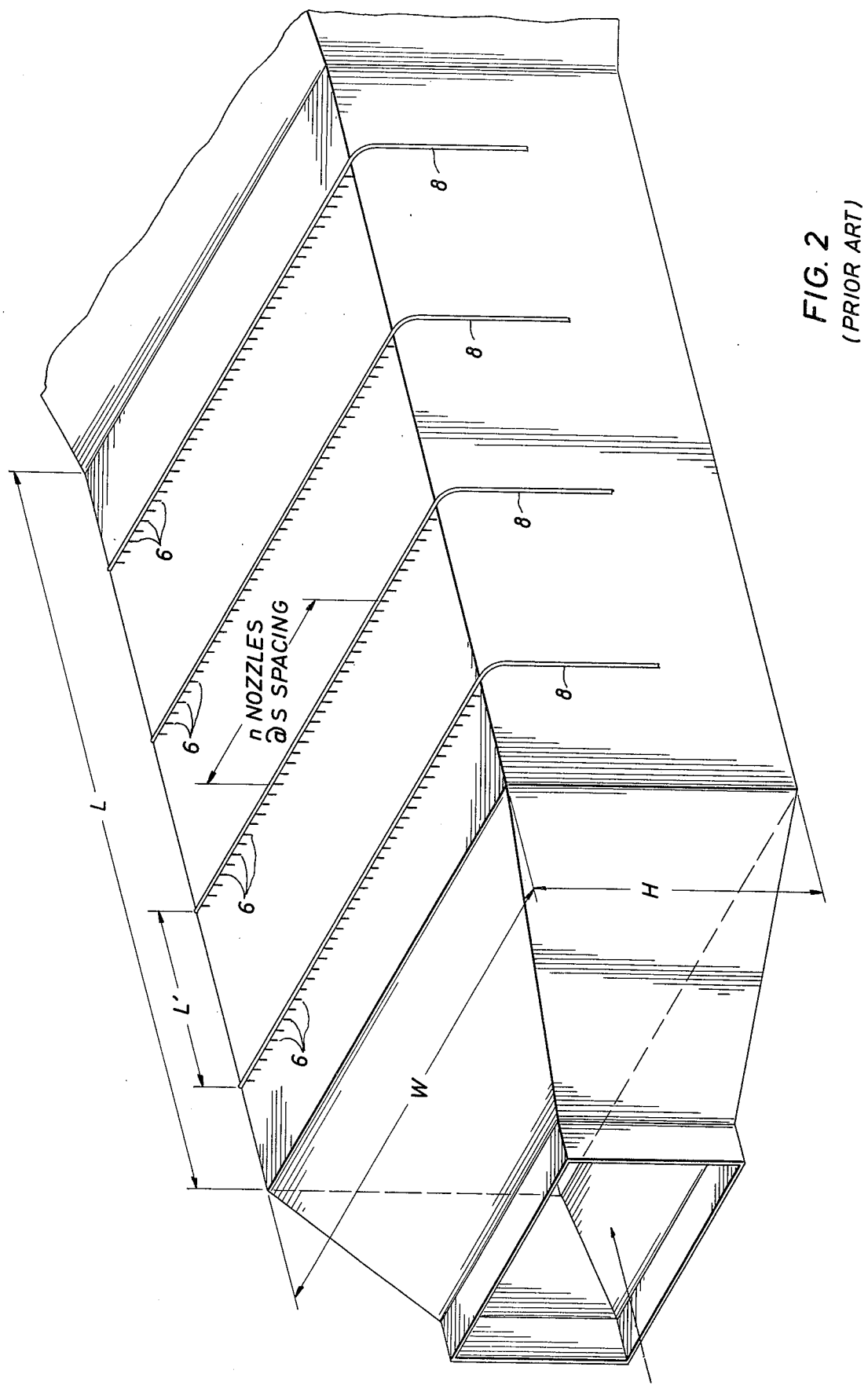

Horizontal, elongate spray scrubbers devoid of internal packing are effective gas-liquid contactors for removal of sulfur dioxide from large volume flows of waste gas. A particularly effective scrubber of this type utilizes aqueous absorbent sprays directed across the chamber substantially perpendicular to the horizontal flow of waste gas as more fully described in U.S. Pat. No. 3,948,608 to Alexander Weir, Jr. A commercial embodiment of this scrubber has a plurality of spray nozzles positioned at the top of the scrubber as illustrated in FIG. 1. The nozzles are arranged in stages as illustrated in FIG. 2 and direct aqueous absorbent substantially vertically downward across cross sections of the gas flow path along the length of the scrubber. Typically, from four to six stages are used. Individual headers convey absorbent to the nozzles of each stage in an amount necessary to satisfy the gas/liquid flow rate ratio (G/L) required for the particular installation. This amount may be, for example, 700 liters per second in each stage discharged through 50 nozzles having 90 degree cone angles spaced 0.163 meters apart along the individual header.

The sulfur dioxide removal or absorption efficiency of these horizontal scrubbers is a function of many variables as reported in our article entitled "The Kellogg-Weir Air Quality Control System", Chemical Engineering Process, pages 64-65, (August 1977) incorporated herein by reference. In summary of relevant aspects of that article, we express the following relationships:

$$\frac{P}{P_o} = e^{-\phi} \quad (1)$$

$$\phi = \frac{2RTN\,L/G}{\frac{dv}{3K_g l} + m} \quad (2)$$

$$\frac{1}{K_g} = \frac{1}{k_g} + \frac{m}{k_l} \quad (3)$$

$$\quad (5)$$

$$k_g = \frac{2}{RT}\sqrt{\frac{Du}{\pi d}}$$

where:
- D = diffusivity of $SO_2$ in the gas phase
- G = gas volume flow rate
- $K_g$ = overall mass transfer coefficient
- L = liquid volume flow rate per stage
- N = number of spray stages
- P = outlet concentration of $SO_2$ in the waste gas
- $P_o$ = inlet concentration of $SO_2$ in the waste gas
- R = gas constant
- T = gas temperature
- d = (Sauter) mean diameter of the spray droplets
- $k_g$ = gas phase mass transfer coefficient
- $k_l$ = liquid phase mass transfer coefficient
- l = mean distance traveled by the spray droplets
- m = slope of the equilibrium curve characterizing the gas/liquid pair
- u = relative velocity between the spray droplets and the gas
- v = mean velocity of the spray droplets.

The relative importance of $k_g$ and $k_l$ varies not only according to the choice of absorbent, but also varies according to the sulfur dioxide concentration existing at any point along the waste gas flow path.

For example, the use of a very effective absorbent such as a 5 weight percent sodium carbonate solution results in little or no liquid phase mass transfer resistance and, as stated in the reference article, m=0. In this circumstance, equation (2) becomes:

$$\phi = 12\sqrt{\frac{Du}{\pi d}} \cdot \frac{lNL}{vdG} \quad (6)$$

On the other hand, the use of a relatively ineffective absorbent such as a calcium carbonate slurry results in high liquid phase mass transfer resistance throughout most or all of the longitudinal waste gas flow path primarily because of slow dissolution of calcium carbonate in water and resulting lower absorption efficiency.

Mass transfer characteristics of other absorbents are generally between the above-mentioned extremes. Quite commonly, a particular system will be liquid phase mass transfer limited proximate the scrubber gas inlet and gas phase mass transfer limited proximate the gas outlet because of the decreasing sulfur dioxide concentration along the waste gas flow path.

Referring to equation (6), one might expect that in a given horizontal scrubber, the efficiency of sulfur dioxide removal will be proportionately increased by increasing the liquid rate in each stage and/or by increasing the number of spray stages. Contrary to expectation, we have found in gas phase mass transfer limited regions that increases in the number of spray stages and/or liquid flow rate do not bring about corresponding increases in sulfur dioxide removal.

We have now found that this anomaly is caused by mutual interference of spray droplets from proximate spray nozzles. These droplets collide and coalesce at the initial horizontal plane of interference and for some distance below that plane until a point is reached where substantially all of the droplets fall parallel with each other and no significant further interference occurs. In the course of travel, droplet mean diameter increases significantly, as much as by a factor of 4, from the initial droplet diameter prior to interference. The increased droplet size results in significant reduction in gas-liquid contact area which, in turn, results in decreased scrubbing efficiency according to equations (1) through (6).

This problem could be avoided by the use of sprays which do not interfere with each other. In view of the large spray volume rate previously recited, however, it is quickly apparent that a horizontal scrubber designed without spray interference would be impractically large.

We have additionally found that some spray interference can exist without significant detrimental effect on the resulting droplet size. To quantify this phenomenon, we express the extent of spray interference by the term "interfering spray density" (I.S.D.) calculated as the average aqueous absorbent flow rate per unit area at any horizontal plane. A method for this calculation is recited later in this specification. The interfering spray density (I.S.D.) attains a maximum value at a short distance below the horizontal plane of initial interference of the spray droplets. Most importantly, we have found that the detrimental effects of spray interference may be significantly reduced by maintaining the I.S.D. below a critical value.

According to the invention, a process and apparatus are provided for removal of sulfur dioxide from waste gas by passing the gas through a horizontal, elongate, gas-liquid contactor having a substantially unrestricted flow path and passing aqueous absorbent substantially vertically downward through the waste gas in a plurality of interfering cones of spray droplets wherein the aqueous absorbent in at least a longitudinal portion of the contactor has a maximum I.S.D. less than about 100 liters per second per square meter at any horizontal plane.

FIG. 1 is an elevation view of a typical horizontal, cross-flow $SO_2$ scrubber having an elongate gas-liquid contacting zone 1, waste gas inlet 2, cleaned gas outlet 3, liquid discharge 4 and collection 5 means, spray nozzles 6, mist eliminator means 7, and means 8 for circulation of aqueous absorbent.

FIG. 2 is a three dimensional illustration of the prior art spray nozzle arrangement for the gas-liquid contacting zone of the FIG. 1 scrubber and shows the conventional close nozzle array in stages which provide sheets of spray droplets across cross-sections of the chamber.

Figure 3:
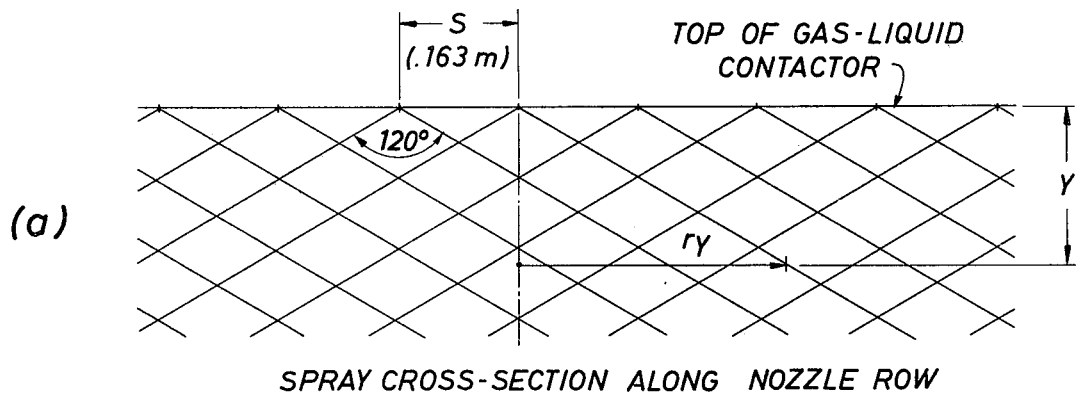
Figure 3:
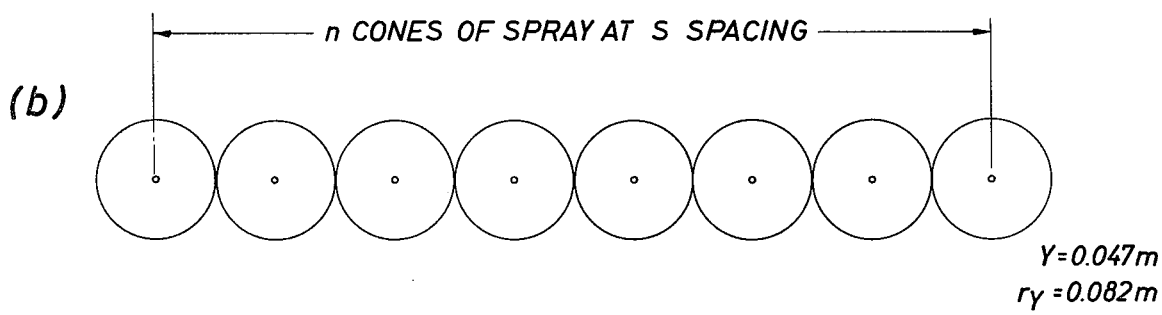
Figure 3:
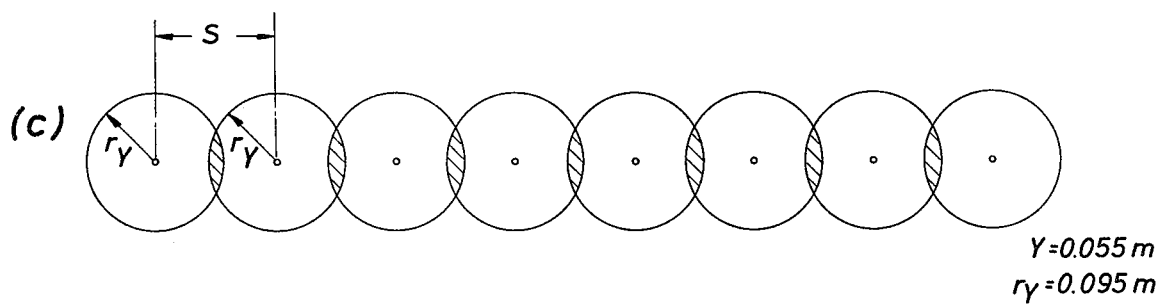
Figure 3:
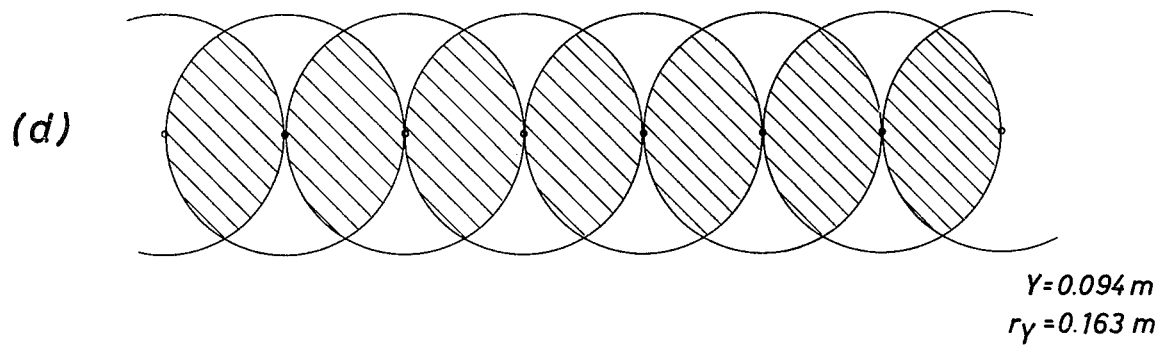
Figure 3A:
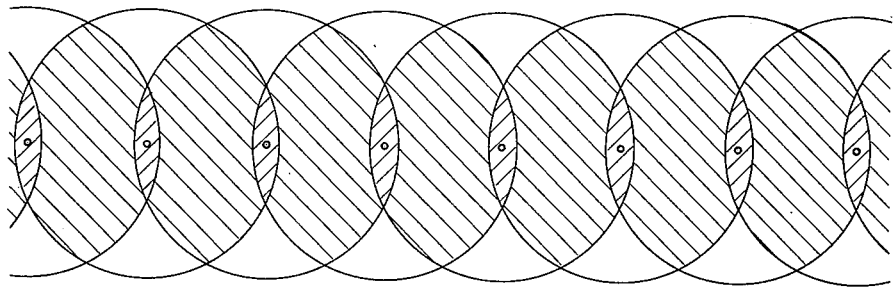
Figure 3A:
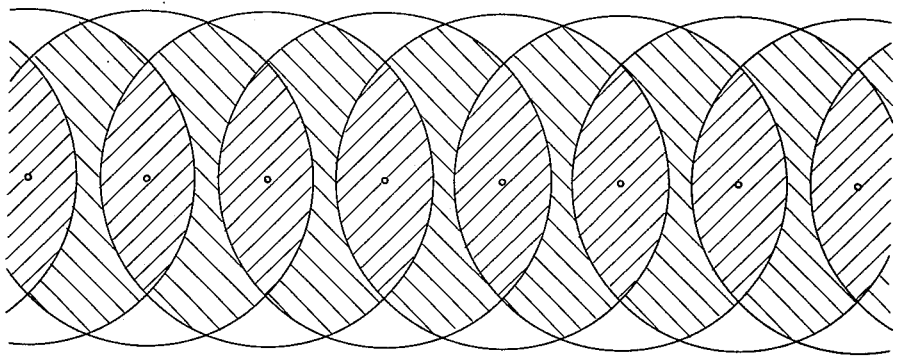
Figure 3A:
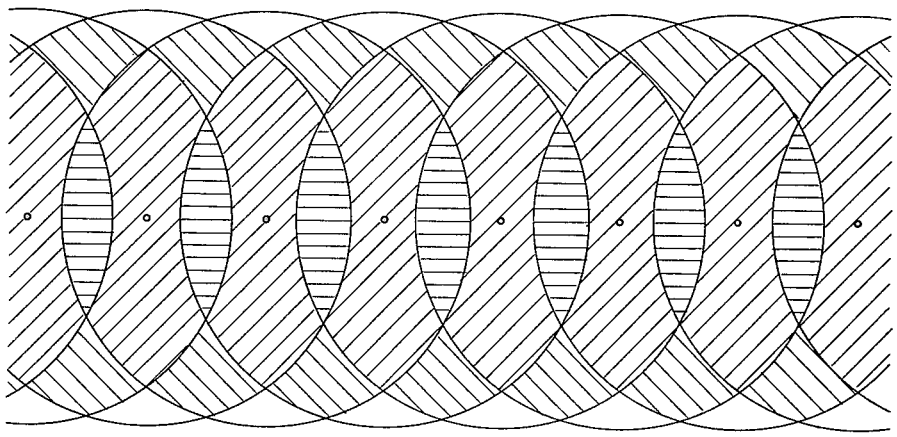

FIG. 3 illustrates the spray patterns at selected horizontal planes within the contacting zone resulting from the spray arrangement of FIG. 2. FIG. 3A is a continuation of FIG. 3. In the calculations relevant to FIGS. 2, 3, and 3A, the nozzle spacing (S) is 0.163 meters and the distance between rows of nozzles (S') is equal to the stage header distance (L') which is 3.05 meters.

Figure 4:
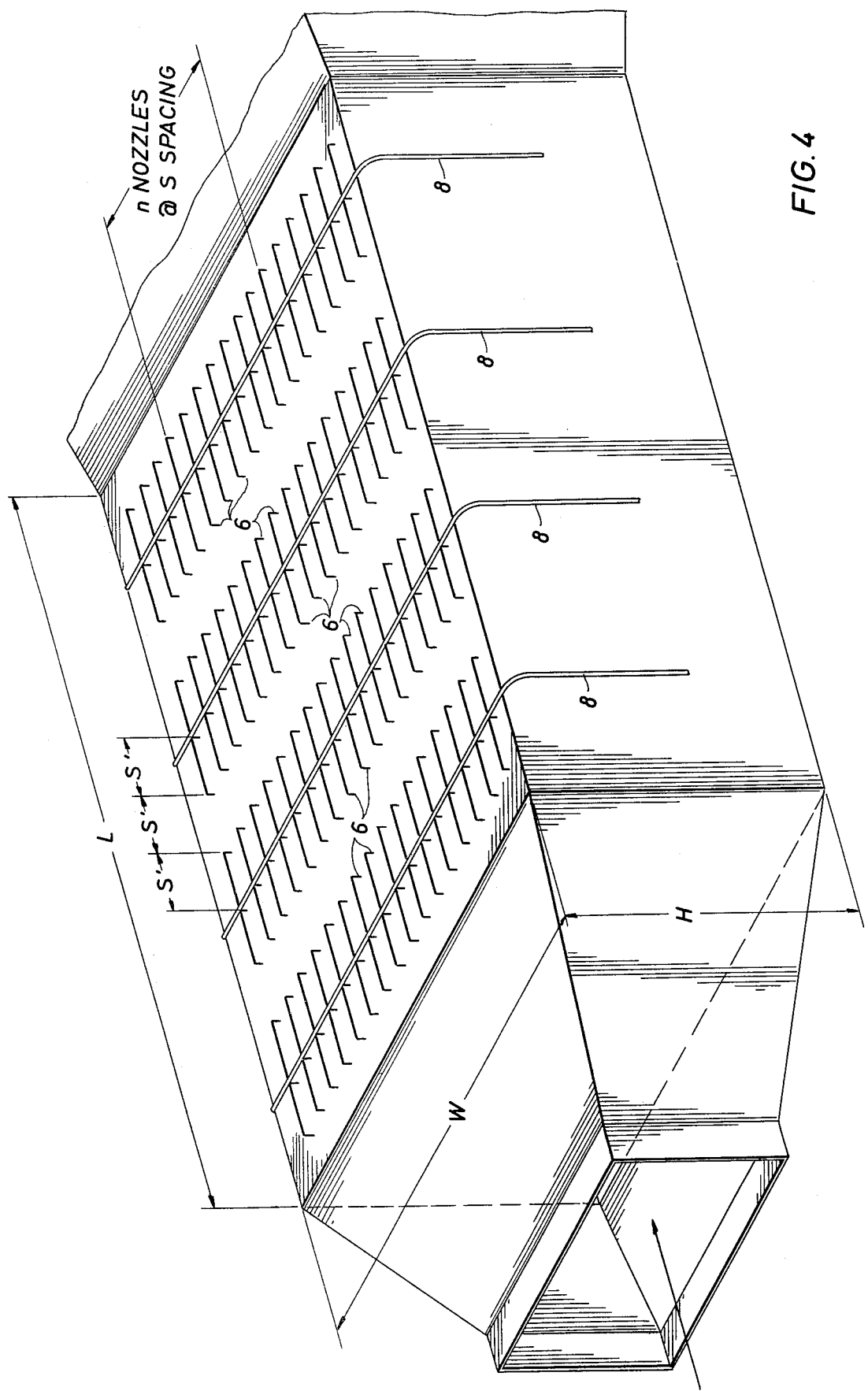

FIG. 4 is a three dimensional illustration of a nozzle arrangement which is an embodiment of the present invention and shows a widely spaced nozzle array in which the spray nozzles are substantially uniformly horizontally spaced apart.

Figure 5:
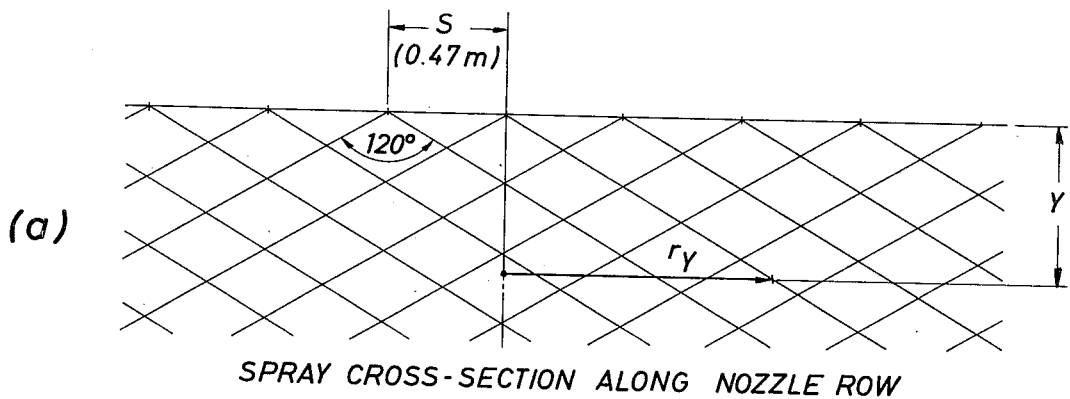
Figure 5:
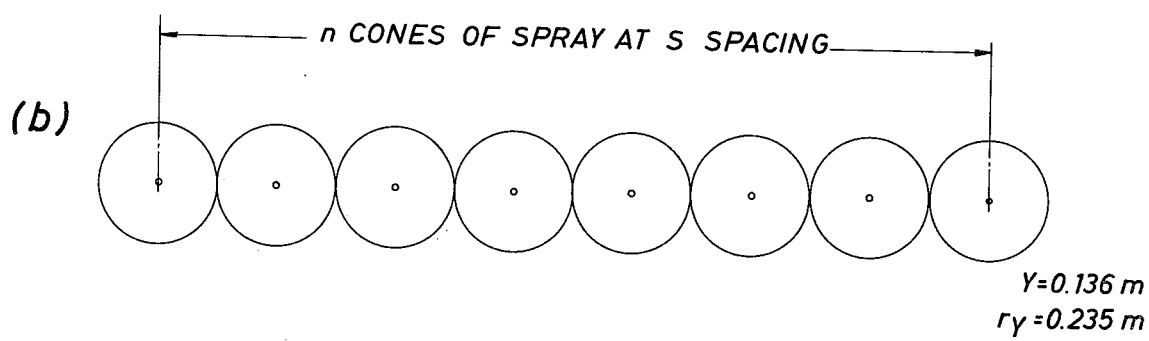
Figure 5:
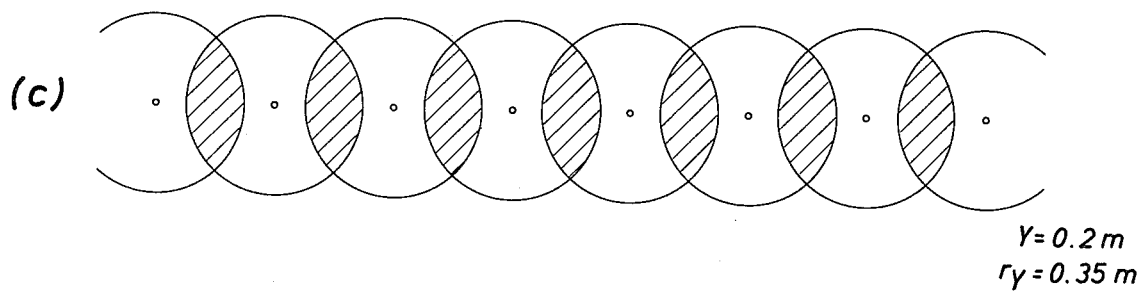
Figure 5:
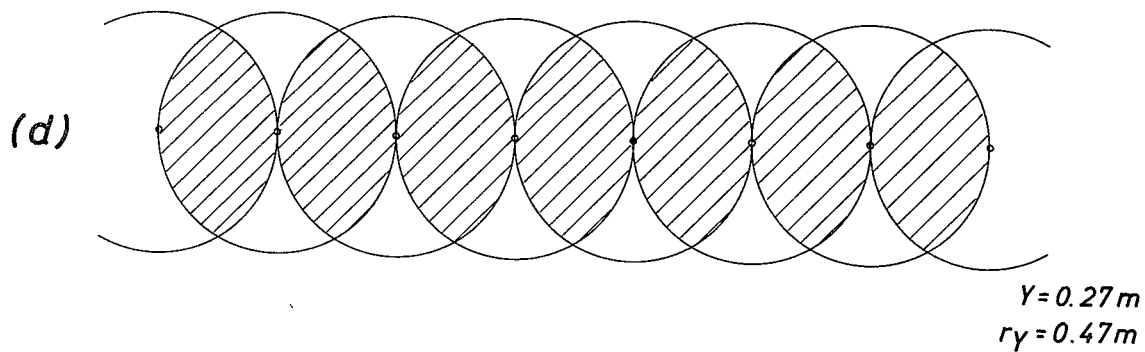
Figure 5A:
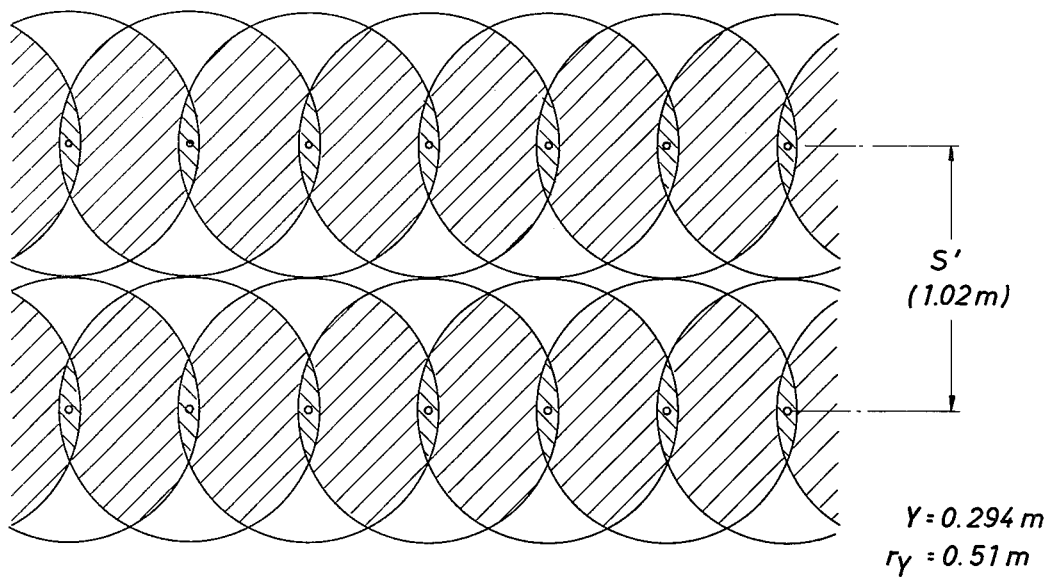
Figure 5A:
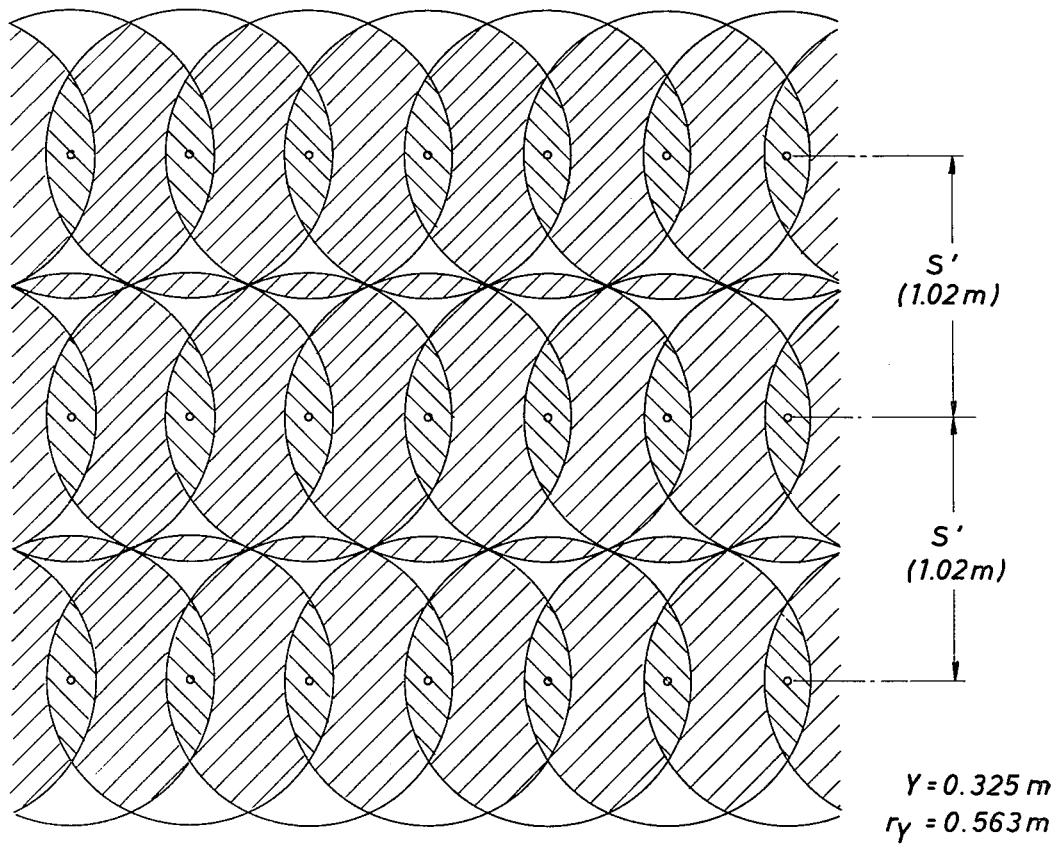

FIG. 5 illustrates the spray patterns at selected horizontal planes within the contacting zone resulting from the spray arrangement of FIG. 4. FIG. 5A is a continuation of FIG. 5. In the calculations relevant to FIGS. 4, 5, and 5A, the nozzle spacing (S) is 0.47 meters and the distance between rows of nozzles (S') is 1.02 meters.

Figure 6:
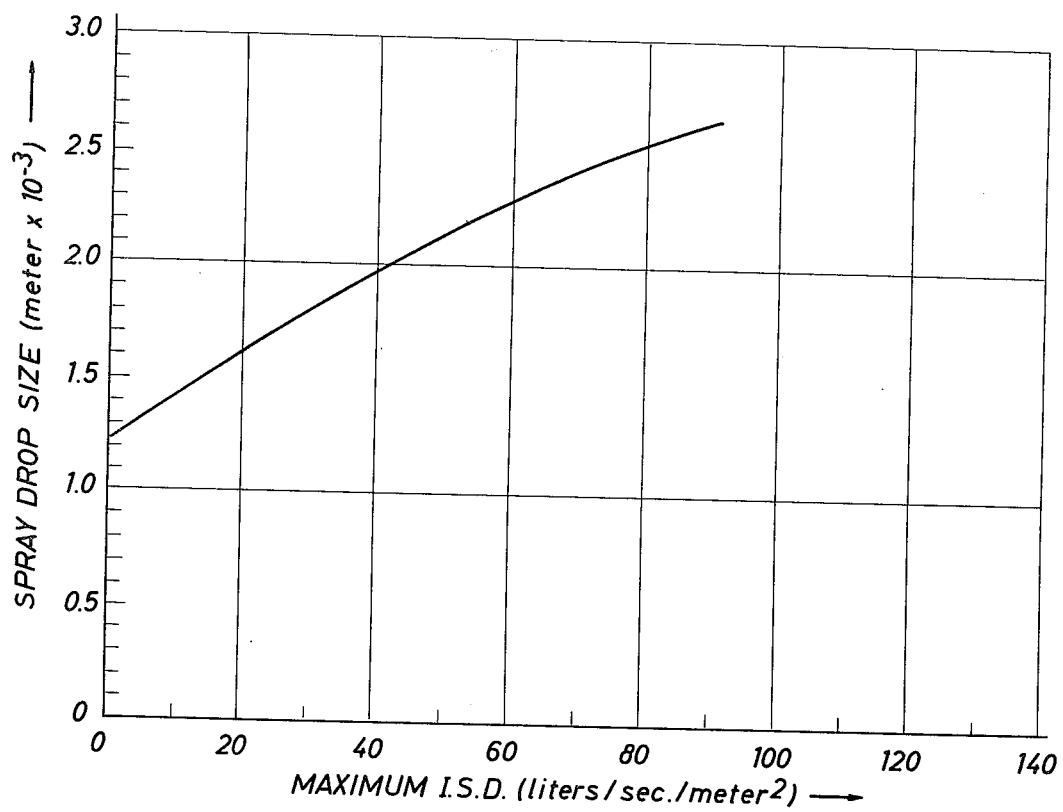

FIG. 6 is a graphical representation of the relationship between maximum I.S.D. and the Sauter mean diameter of spray droplets subsequent to interference. Data for FIG. 6 was developed experimentally using 120 degree spiral cone nozzles which produced spray droplets having an initial mean diameter of 1230 microns (refer to drop size at I.S.D.=0). The curve may be adjusted vertically to extrapolate values for larger or smaller initial drop sizes.

Figure 7:
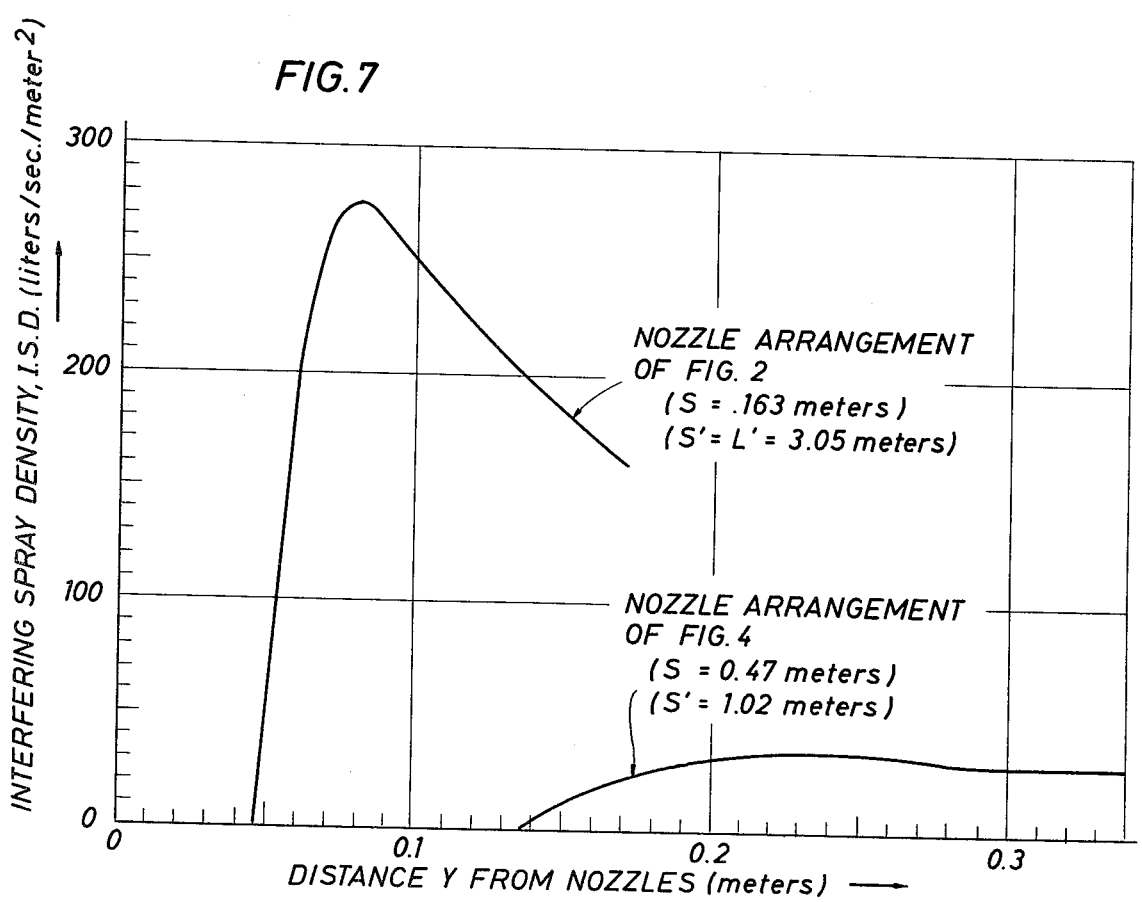

FIG. 7 is a graphical representation of the I.S.D. existing at various horizontal planes for the nozzle arrangements of FIG. 2 and FIG. 4. The values shown were calculated by the method described in the Appendix to this specification. FIG. 7 shows that the I.S.D. throughout the height of the contacting zone can be maintained at low values if the maximum I.S.D. which occurs just below the plane of initial interference is limited to a low value.

The waste gas treated by the process and apparatus of this invention is sulfur dioxide containing gas in large volume, typically from about 50 to about 800 actual cubic meters per second, discharged from sources such as steam power plants, smelters, refineries, pulp mills, or chemical operations. Combustion gas from coal fired power plants is particularly in point. This gas is typically composed of nitrogen, carbon dioxide, oxygen and smaller amounts of other gases including sulfur dioxide in concentrations of from about 200 to about 6,000 parts per million by volume. The gas to be scrubbed also normally contains particulate matter such as fly ash which varies in quantity according to the waste gas source and the extent of upstream removal by, for example, precipitators.

The gas-liquid contacting zone is, as previously mentioned, a horizontal, elongate contacting chamber or scrubber having a waste gas inlet at one end and a cleaned gas outlet at the other end. The contactor may be internally baffled to direct gas flow in a somewhat sinusoidal flow path in which case the gas flow is, to a degree, countercurrent to the downward flow of aqueous absorbent. Preferably, the contact zone has a horizontal gas flow path with no restriction to either gas or liquid flow such as packing, trays, mesh, baffles, or the like.

The chamber is preferably substantially rectangular in cross section across the gas flow path with a height of from about 3 to about 9 meters and a ratio of height to width of from about 0.4 to about 3.0. The chamber will also have liquid collection and discharge means disposed at the bottom thereof for further processing and recycle of spent or $SO_2$—laden absorbent. The collection and discharge means may include reaction tanks that are attached to the scrubber as sumps.

The contacting zone includes a plurality of spray nozzles for aqueous absorbent positioned at the top of the scrubber to direct a corresponding plurality of interfering cones of spray droplets substantially vertically downward through the waste gas. The liquid flow rate for various groups of nozzles along the length of the scrubber and the total aqueous absorbent flow rate within the contacting zone is a function of the desired $SO_2$ removal efficiency as well as the other variables expressed in Equation (2). Within the longitudinal portion of the contacting zone that is gas phase mass transfer limited, a volume flow rate ratio of waste gas to aqueous absorbent of from about 200:1 to about 5000:1 per meter of length of the contacting zone is suitable for the range of $SO_2$ concentrations typically existing in this region. We prefer that the spray nozzles be substantially uniformly horizontally spaced apart so that the aqueous absorbent has a substantially uniform interfering spray density of any horizontal plane within the longitudinal portion, not only for control and optimization of liquid flow rate but also to avoid gas channeling in the contacting chamber.

One advantage of a horizontal scrubber of the type described is its capability to treat a large volume rate of gas at relatively low pressure drop. Despite this advantage, it is desirable to place some limit on gas velocity to avoid significant entrainment of aqueous absorbent in the gas stream and minimize forward sweep of the generally vertically discharged spray. Gas velocity may range from about 3 to about 10 meters per second. Parameters for gas velocity, scrubber height, and spray nozzles should be selected to yield an average relative velocity between waste gas and aqueous absorbent of from about 7 to about 14 meters per second and a residence time of aqueous absorbent in the contacting zone of from about 0.3 to about 1.5 seconds.

As previously noted, mass transfer characteristics of aqueous absorbents for $SO_2$ removal systems vary considerably. The active components of these absorbents are well known and include sodium carbonate, sodium sulfite, calcium oxide or hydroxide, and calcium carbonate. The calcium reagents form calcium sulfite and, when oxygen is present, calcium sulfate upon reaction with $SO_2$ absorbed in water as sulfurous acid. They are commercially popular because of their low cost, but when used alone, have relatively high liquid phase mass transfer resistance. When calcium reagents are promoted with soluble sulfates such as magnesium sulfate as disclosed in U.S. Pat. No. 3,883,639, reactivity of the absorbent is considerably enhanced and liquid phase mass transfer resistance is decreased to a value approaching that of sodium carbonate throughout a substantial longitudinal portion of the contactor. In such systems, consideration of maximum I.S.D. is applicable throughout most, if not all, the length of the gas-liquid contactor.

Spray droplets originate from the nozzles as distinct cones of spray droplets having an initial Sauter mean diameter of from about 800 to about 2000 microns. While a variety of individual nozzle spray patterns may be utilized, we prefer to use nozzles which form substantially circular cones of spray having an included angle of from about 80 to about 120 degrees. Preferred nozzles have relatively uniform spray density, small initial drop size, and high flow/low pressure drop characteristics. Preferably, each nozzle discharges aqueous absorbent at a rate of from about 9 to 19 liters per second at an initial droplet velocity of from about 9 to about 21 meters per second. The nozzle pressure should be sufficient to produce droplets within the mean diameter range recited above and will typically be from about 2 to about 3.5 kilograms per square centimeter absolute.

As previously recited, increasing the liquid flow rate in the gas phase mass transfer limited portion of a given scrubber configuration does not proportionately increase $SO_2$ removal efficiency. The required closer nozzle spacing and/or nozzle flow rate results in higher spray densities and increased interference among the sprays. Referring now to FIG. 6, it may be seen that increases in I.S.D. at the horizontal plane of maximum I.S.D. results in radically increased spray droplet size. As previously noted, this is due to interference and coalescense among the droplets. Since, according to Equations (1) and (6), $SO_2$ removal efficiency varies inversely with the droplet size, the significance of spray interference and necessity for limitation on the I.S.D. may be appreciated. Accordingly, the specific configuration of sprays and resulting maximum I.S.D. is selected to yield spray droplets having a Sauter mean diameter subsequent to interference of from about 1100 to about 4000 microns to obtain maximum practical gas-liquid contact area.

Since droplet size cannot be decreased subsequent to interference, it follows that interference must be controlled at the horizontal plane of maximum I.S.D. This maximum is best found by calculating I.S.D. at various levels in the contacting zone proximate the nozzles. A method for I.S.D. calculation is provided in the appendix of this specification. Since wide cone angle sprays are used in horizontal scrubbers to avoid bypassing waste gas in the upper part of the contacting zone, the horizontal plane of maximum I.S.D. will normally be found within about one meter vertical distance from the point of spray nozzle discharge. Considering the $SO_2$ removal systems previously discribed, the maximum interfering spray density within the contacting zone should not exceed about 100 liters per second per square meter. Where the contacting chamber has a substantially rectangular cross section, a height of from about 3 to about 9 meters and ratio of height to width of from about 0.4 to about 3.0 and utilizes circular cones of spray having an original included angle of from about 80 to about 120 degrees, the maximum I.S.D. is preferably about 45 liters per second per square meter. From a technical viewpoint, there is no lower limit on the maximum I.S.D., however, economic considerations place this value at about 10 liters per second per square meter. Within the above mentioned parameters the preferred minimum nozzle spacing is about 0.4 meters. Maximum nozzle spacing is limited by considerations of gas channeling and economic scrubber design rather than interfering spray density. Within the range of spray cone angles recited, the maximum preferred nozzle spacing is about 0.85 meters.

The longitudinal portion of the contactor in which the maximum I.S.D. is limited is most effectively that portion in which $SO_2$ removal is gas phase mass transfer limited. This portion will generally exist proximate the cleaned gas outlet. Correspondingly, there is generally no gas phase mass transfer limitation proximate the waste gas inlet. In this region, it may be desirable to utilize low G/L ratios and high spray density according to the prior art configuration illustrated in FIG. 2.

With respect to the longitudinal portion of the contactor in which the maximum I.S.D. is limited, ie.—generally the gas phase mass transfer limited portion, one may see from FIG. 4 that the prior art concept of spray stages becomes moot in considering distribution of gas-liquid contact area within the chamber. While sprays may be staged with accompanying large gaps in spray coverage along the length of the scrubber, there is no technical or economic incentive to do so when using only one type of aqueous absorbent. Nevertheless, the headers which feed groups of spray nozzles are preferably staged for convenience in piping layout and optimization of liquid flow rates along the length of the contacting zone.

To illustrate the invention, Table I provides a summary of calculated comparative performance of an $SO_2$ absorber designed both with the prior art spray arrangement of FIG. 2 and with the FIG. 4 spray arrangement which is an embodiment of the present invention. These spray arrangements result in interfering spray densities, calculated by the method described in the appendix, that are plotted in FIG. 7 as a function of the vertical distance below the nozzle arrays. The maximum I.S.D. for the prior art nozzle arrangement is 276 liters per second per square meter which, according to FIG. 6, corresponds to a droplet mean diameter greater than $2.5 \times 10^{-3}$ meters. On the other hand, the maximum I.S.D. for the nozzle arrangement of FIG. 4 is only 33.1 liters per second per square meter corresponding to a droplet mean diameter of $1.85 \times 10^{-3}$ meters. In this comparison, a 5 weight percent solution of sodium carbonate is utilized as aqueous absorbent since this results in gas phase mass transfer limitation throughout most of the length of the contacting zone.

Upon application of the tabular values to Equation (6), the $SO_2$ removal per stage is found to be less than 68% for the prior art nozzle arrangement and 83% for the nozzle arrangement of FIG. 4. In terms of a commercial $SO_2$ removal system utilizing a horizontal scrubber, this increase in performance results in a decrease in the number of spray stages required for nearly complete $SO_2$ removal from over four to three. The reduction in number of spray stages results in lower initial cost of the scrubber installation as well as significantly reduced cost for circulating the lesser amount of aqueous absorbent.

TABLE I

| Contactor dimensions: | | |
|---|---|---|
| Width | W | 8 meters |
| Height | H | 5.5 meters |
| Length (overall) | L | 12.2 meters |
| Stage spacing | L' | 3.05 meters |
| Gas flow rate | G | 295 meters$^3$/sec. |
| Gas velocity | — | 6.7 meters/sec. |
| number of nozzles per stage | — | 48 |
| Flow rate per nozzle | — | 14 liters/sec. |
| Spray cone angle | — | 120° |
| Initial droplet size (Sauter mean diam.) | d° | 1.23 × 10$^{-3}$ meters |
| Droplet travel | l | 6 meters |
| Droplet mean velocity | v | 9 meters/sec. |
| Gas/liquid relative velocity | u | 11.2 meters/sec. |
| Gas/liquid volume flow rate per stage | G/L | 439 |
| SO$_2$ concentration in waste gas | — | 3000 ppmv |
| SO$_2$ diffusivity | D | 1.67 × 10$^{-5}$ meters$^2$/sec. |
| Nozzle arrangement | | FIG. 2 | FIG. 4 |
| Nozzle spacing | S | 0.163 meters | 0.47 meters |
| Nozzle row spacing | S' | 3.05 meters | 1.02 meters |
| Maximum Interfering Spray Density | Max. I.S.D. | 276 lit/sec /m$^2$ | 33 lit/sec/m$^2$ |
| Effective droplet size (Sauter mean diam.) | d | >2.5 × 10$^{-3}$m | 1.85 × 10$^{-3}$m |
| SO$^2$ removal exponent | φ | <1.12 | 1.77 |
| SO$_2$ removal per stage | | <68% | 83% |
| Number of stages required for 99.5% SO$_2$ removal | N | >4 | 3 |

APPENDIX

Calculation of Interfering Spray Density (I.S.D.)

The following exemplary method for calculation of interfering spray density (I.S.D.) is provided with particular reference to FIGS. 3–3A, and 5–5A.

Referring to FIG. 3, part (a) which illustrates a vertical cross-section through a row of 120° spray cones with S spacing along the row, the interfering spray density (I.S.D.) at any horizontal plane y is the weighted average of spray densities existing at that plane excluding the fraction having no interference.

The I.S.D. may be calculated as the summation of the multiple, fractional densities that exist at the plane in question:

$$I.S.D._y = \sum_i f_{yi} (SD_{yi}) \quad (7)$$

$SD_{yi}$ is the spray density for areas of interference involving i cones of spray at the plane y and is equal to $iQ/\pi r_y^2$ where:

i = number of interfering cones of spray
 Q = flow rate per nozzle (liters/sec.)
 $r_y$ = radius of spray cone at plane y (meters)
 $f_{yi}$ is the fraction of spray involved in a given interference with i cones of spray (i=2,3,4- - -) at the plane in question and is determined from the pattern of interfering sprays at that plane. Referring to FIG. 3, part (c), the fraction of spray that is interfering may be derived from:

$$f_{yi} = \frac{2}{\pi}(\cos^{-1} P - P\sqrt{1 - P^2}) \quad (8)$$

where $P = S/2r_y$

For the prior art spray arrangement of FIG. 2 and the resulting spray patterns shown in FIGS. 3 and 3A, the Table I values required for calculation of I.S.D. are:
 S = 0.163 meters
 Q = 14 liters/sec.
 Spray cone angle = 120°
 y = variable
 $r_y = y \tan 60°$
 $P = (S/2r_y)$

FIG. 3, (b):

when $0 \leq r_y \leq S/2$, there is no spray interference and I.S.D.$_y = 0$.

FIG. 3, (c) (d):

when $\frac{S}{2} < r_y \leq S$, there is two spray interference.

$I.S.D._y = f_{y2}(SD_{y2})$ $$f_{y2} = 2\left(\frac{2}{\pi}(\cos^{-1} P - P\sqrt{1 - P^2})\right)$$

$$SD_{y2} = \frac{2Q}{\pi r_y^2}$$

FIG. 3A, (e) (f):

when $S < r_y \leq 3/2\, S$, there are both two and three spray interferences.

$I.S.D._y = f_{y2}(SD_{y2}) + f_{y3}(SD_{y3})$ $$f_{y3} = 3\left(\frac{2}{\pi}(\cos^{-1} 2P - 2P\sqrt{1 - (2P)^2})\right)$$

$$f_{y2} = 2\left(\frac{2}{\pi}(\cos^{-1} P - P\sqrt{1 - P^2}) - \frac{2}{3} f_{y3}\right)$$

$$SY_{y3} = \frac{3Q}{\pi r_y^2}$$

$$SD_{y2} = \frac{2Q}{\pi r_y^2}$$

FIG. 3A, (g):

when $3/2\, S < r_y \leq 2S$, there are two, three and four spray interferences.

$$I.S.D. = \sum_{i=2}^{4} f_{yi}(SD_{yi})$$

$$f_{y4} = 4\left(\frac{2}{\pi}(\cos^{-1} 3P - 3P\sqrt{1 - (3P)^2})\right)$$

$$f_{y3} = 3\left(\frac{2}{\pi}(\cos^{-1} 2P - 2P\sqrt{1 - (2P)^2}) - \frac{2}{4} f_{y4}\right)$$

$$f_{y2} = 2\left(\frac{2}{\pi}(\cos^{-1} P - P\sqrt{1 - P^2}) - \frac{2}{3} f_{y3} - \frac{2}{4} f_{y4}\right)$$

$$SD_{yi} = \frac{iQ}{\pi r_y^2}$$

Results from the foregoing calculations at the horizontal planes y shown on FIGS. 3 and 3A have been plotted in FIG. 7 where it may be seen that the spray nozzle arrangement of FIG. 2 has a maximum I.S.D. of 276 liters/sec/meter$^2$ occurring at a plane 0.08 meters below the nozzles.

For the nozzle arrangement of FIG. 4 and the resulting spray patterns shown in FIGS. 5 and 5A, the Table I values required for calculation of I.S.D. are:

S = 0.47 meters
S' = 1.02 meters
Q = 14 liters/sec.
Spray cone angle = 120°
y = variable
$r_y$ = y Tan 60°
P = S/2$r_y$
P' = S'/2$r_y$

FIG. 5, (b):

when $0 \leq r_y \leq S/2$, there is no spray interference and $I.S.D._y = 0$

FIG. 5, (c) (d):

when $S/2 < r_y \leq S$, there is two spray interference.

$$I.S.D._y = f_{y}(SD_{y2})$$

$$f_{y2} = 2\left(\frac{2}{\pi}(\cos^{-1} P - P\sqrt{1 - P^2})\right)$$

$$SD_{y2} = \frac{2Q}{\pi r_y^2}$$

FIG. 5A, (e):

when $S < r_y \leq S'/2$, there are both two and three spray interferences within the same row but not interference between adjacent rows.

$$I.S.D._y = \sum_{i=2}^{3} f_{yi}(SD_{yi})$$

$$f_{y3} = 3\left(\frac{2}{\pi}(\cos^{-1} 2P - 2P\sqrt{1 - (2P)^2})\right)$$

$$f_{y2} = 2\left(\frac{2}{\pi}(\cos^{-1} P - P\sqrt{1 - P^2}) - \tfrac{2}{3} f_{y3}\right)$$

$$SD_{yi} = \frac{iQ}{\pi r_y^2}$$

FIG. 5A, (f):

when $S'/2 < r_y \leq \sqrt{S^2 + S'^2}/2$, there is both two and three spray interferences within the same row. Additionally, there is the spray interference between adjacent rows.

$$I.S.D._y = \sum_{i=2}^{3} f_{yi}(SD_{yi})$$

$$f_{y3} = 3\left(\frac{2}{\pi}(\cos^{-1} 2P - 2P\sqrt{1 - (2P)^2})\right)$$

$$f_{y2} = 2\left(\frac{2}{\pi}(\cos^{-1} P - P\sqrt{1 - P^2}) - \tfrac{2}{3} f_{y3}\right) +$$

-continued $$2\left(\frac{2}{\pi}(\cos^{-1} P' - P'\sqrt{1 - P'^2})\right)$$

$$SD_{yi} = \frac{iQ}{\pi r_y^2}$$

Results from the last group of calculations at the horizontal planes y shown on FIGS. 5 and 5A have also been plotted in FIG. 7 where it may be seen that the spray arrangement of FIG. 4 has a maximum I.S.D. of 33 liters/sec/meter$^2$ occurring through the planes at about 0.2 to about 0.3 meters below the nozzles.

We claim:

1. A process for removing sulfur dioxide from industrial waste gas comprising:
    (a) passing the waste gas substantially horizontally through a horizontal, elongate, gas-liquid contacting zone having a substantially unrestricted flow path, a waste gas inlet at one end, and a cleaned gas outlet at the opposite end; and
    (b) passing aqueous absorbent through the waste gas within at least a longitudinal portion of the gas-liquid contacting zone in a plurality of interfering cones of spray droplets having an initial Sauter mean diameter of from about 800 to about 2000 microns directed substantially vertically downward wherein the aqueous absorbent has a maximum interfering spray density at any horizontal plane within the longitudinal portion less than about 100 liters per second per square meter.

2. A process according to claim 1 wherein the interfering cones of spray droplets are formed from distinct, substantially circular cones of spray droplets having an included angle of from about 80 to about 120 degrees and the spray droplets have a Sauter mean diameter of from about 1100 microns to about 4000 microns subsequent to interference.

3. A process according to claim 2 wherein the spray droplets of the distinct cones have an initial velocity of from about 9 to about 21 meters per second and the aqueous absorbent has a residence time in the contacting zone of from about 0.3 to about 1.5 seconds.

4. A process according to claim 2 wherein the aqueous absorbent has a substantially uniform interfering spray density at any horizontal plane within the longitudinal portion of the gas-liquid contacting zone.

5. A process according to claim 1 wherein the waste gas flow rate is from about 50 to about 800 actual cubic meters per second and the aqueous absorbent contains an active compound selected from the group consisting of sodium carbonate, sodium sulfite, and a calcium compound which forms calcium sulfite upon reaction with sulfurous acid.

6. A process according to claim 5 wherein the average relative velocity between the waste gas and the aqueous absorbent is from about 7 to about 14 meters per second and the volumetric flow rate ratio of waste gas to aqueous absorbent within the longitudinal portion is from about 200:1 to about 5000:1 per meter of length of the contacting zone.

* * * * *